(No Model.) 2 Sheets—Sheet 1.

H. BRYAN.
HEADER ATTACHMENT FOR HARVESTERS.

No. 404,954. Patented June 11, 1889.

Witnesses,
Geo. H. Strong
J. A. Nourse

Inventor,
H. Bryan
By Duvey & Co
Attys (No Model.) 2 Sheets—Sheet 2.

H. BRYAN.
HEADER ATTACHMENT FOR HARVESTERS.

No. 404,954. Patented June 11, 1889.

Witnesses,
Geo. H. Strong
J. H. Krouse

Inventor
H. Bryan
By Dewey & Co.
Attys

UNITED STATES PATENT OFFICE.

HENRY BRYAN, OF MODESTO, CALIFORNIA.

HEADER ATTACHMENT FOR HARVESTERS.

SPECIFICATION forming part of Letters Patent No. 404,954, dated June 11, 1889.

Application filed October 20, 1888. Serial No. 288,687. (No model.)

*To all whom it may concern:*

Be it known that I, HENRY BRYAN, of Modesto, Stanislaus county, State of California, have invented an Improvement in Header Attachments for Harvesters; and I hereby declare the following to be a full, clear, and exact description of the same.

My invention relates to a means for connecting the header portion of a combined harvester with the thrashing mechanism in such a manner that the header-frame may be raised and depressed with relation to the thrasher-frame and independent of the mechanism by which it is tilted, so as to raise and depress the cutter-bar.

The object of this invention is to raise and lower the whole frame of the header, so that it may be used in very tall or in very short grain without tilting the header to such an angle that the heads will fall off toward the front and be lost, which is the case where the adjustments depend altogether on the tilting of the frame.

Figure 1:
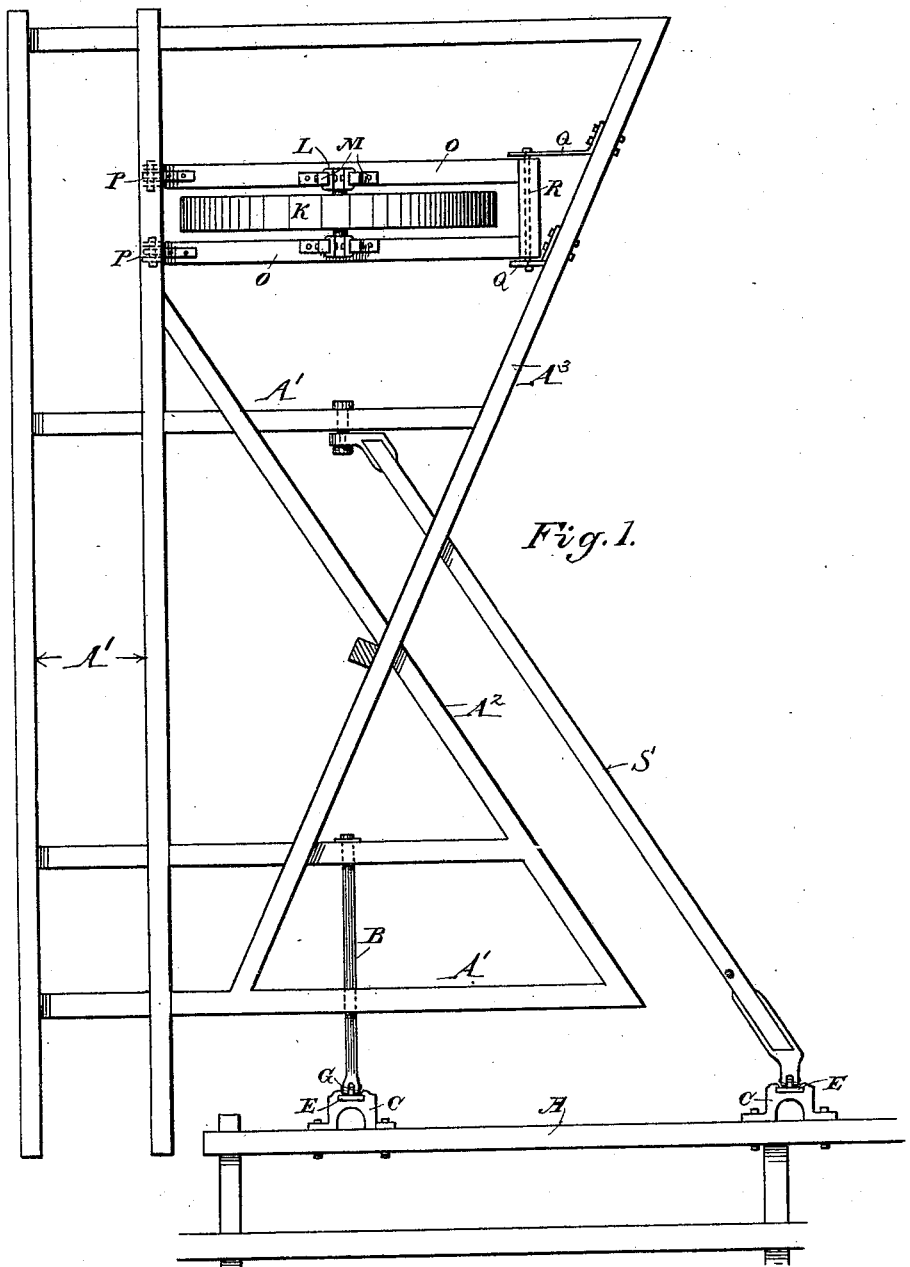
Figure 2:
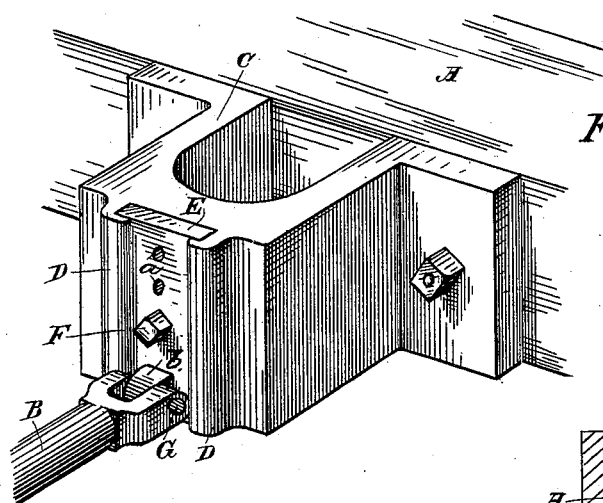
Figure 3:
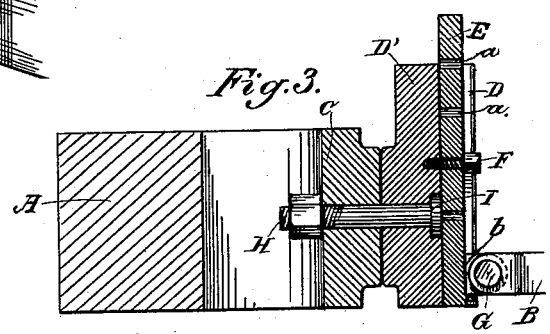
Figure 4:
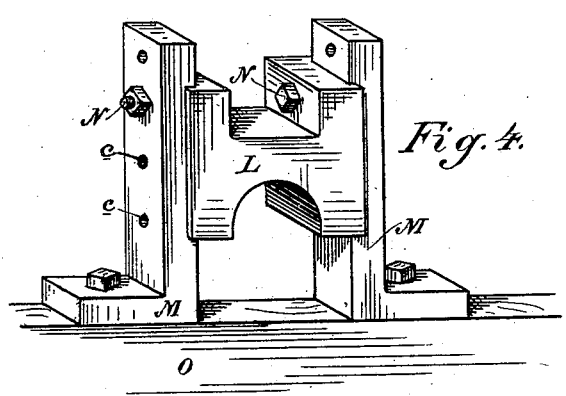
Figure 5:
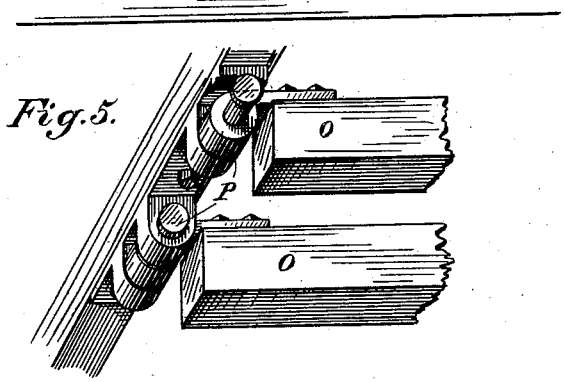
Figure 6:
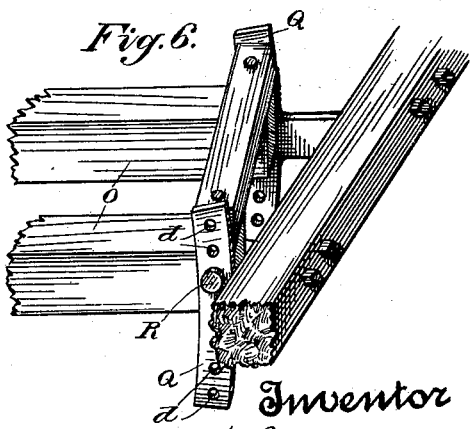

Referring to the accompanying drawings for a more complete explanation of my invention, Figure 1 is a plan showing one form of header-frame with my attachment. Fig. 2 is a view showing one of the horizontal side timbers of the thrashing-machine frame and the device by which the header-frame is adjustably attached thereto. Fig. 3 is a sectional elevation showing a modification of the same. Fig. 4 is a view of the device for regulating the height of the outer end of the header-frame. Figs. 5 and 6 show the attachments of the ends of the timbers O, which carry the outer wheel journal-boxes.

A is one of the horizontal longitudinal side timbers of the thrashing-machine frame, and B is the pivot-pin, which serves as a connection between the thrashing-machine and the header-frame, and about which as an axis the header-frame is allowed to tilt, so as to raise and depress the forward end to accommodate the cutter to high or low grain.

The difference between grain in different seasons and in different fields in the same locality is sometimes as great as five or six feet, being very high when the straw is strong and very short when the grain has suffered from want of moisture at a certain time in its growth, although in the case of the short grain it very often heads out very fully and is quite as valuable as that which shows the heavier straw. In this latter case, however, if the header-frame has to be tilted about the pivotal supports, so as to depress the cutter sufficiently to properly head this grain, the inclination will be so great that the heads will many of them fall off of the front and be entirely lost and wasted.

The header-frame may be of any suitable construction, being herein shown as comprising the timbers $A'$, secured together at right angles with each other, the diagonal timber $A^2$, and a bracing-timber $A^3$, which extends diagonally across from the front of the side nearest the thrasher-frame to the rear of the outer side of the header-frame.

By my invention the whole body of the header-frame is elevated or depressed to suit the different heights of grain that it may have to work in independent of the tilting adjustment, as follows:

C is a heavy casting, which is bolted upon the side of the timber A, this casting being preferably made in the form of an arch, so that it is convenient to reach the bolt which passes through the arch, and also for the purpose of reducing the weight. Upon the outer side of the casting C is fixed a plate having vertical guides D; or these guides may be cast directly upon the outer surface in one piece with the casting C, as shown in Fig. 2, if preferred. Between the guides D D, I fit a slide E, which travels vertically, being held in place by these guides and secured at any desired point of elevation by the screw-bolt F, passing through the holes $a$ in the slide E. A lug $b$ projects from the sliding piece E, and a pivotal pin or bolt B is hinged to this lug $b$, as shown at G. This pivot-pin B passes through the side timbers of the header-frame, or into journal or bearing boxes secured to said timbers, so that the side of the header-frame adjacent to the thrashing-machine is supported upon this pivot-pin, which acts as a fulcrum about which the header-frame is tilted. This side of the header-frame may be raised or depressed by moving the slide E up or down between the guides D, simply changing the bolt F to any one of the holes made through the plate and screwing it into the block C, or allowing it to pass through said block and securing it with the nut upon the inside. In the modification shown in Fig. 3 I fit the part D', which carries the guides D, to the block C by means of a stout pivot-pin or bolt H, having a head I, which is countersunk in the bottom of the channel formed by the guides D, and the shaft of the bolt passes through the block C to the inside of the arch, where it is secured by the nut.

The outer face of C and the inner face of D' are fitted so that they may turn easily upon each other about the bolt H. With this construction the pin or bolt B may be made square, or it may have its end rigidly fixed to the header-frame, as it will be manifest that the plate D' will turn upon the bolt H, and thus follow any tilting movements of the header-frame without the necessity of pivoting the header-frame upon the pin B. The sliding plate E in this case is moved up and down and secured in the adjustment in the guides D in the same manner as above described.

The outer end of the header-frame is supported upon a single bearing-wheel K, the axle of which is approximately in line with the pivotal attachment of the thrashing-machine frame A, and it will be manifest that the thrasher must have its outer end raised and depressed about this wheel to correspond with the raising and depressing of the inner end, previously described. This may be done by the employment of the sliding boxes L, in which the ends of the wheel-axle turn, these boxes being raised or lowered between the standards M, bolted to the wheel-frame and extending upwardly from it, these standards having holes c made through them for the reception of bolts N, which pass through the standards and into the sides of the boxes L. In some cases the frame-timbers O, upon which the boxes L of the shaft of the wheel K are supported, have one end hinged to the timbers of the header-frame, as shown at P. The opposite ends of these timbers are then fitted to move between the curved adjusting-plates Q, and have holes d made in them, and by means of a pin R, which passes through these rack-plates and through the ends of the timbers O, it will be seen that these timbers may be raised or depressed about the fulcrum-pin P, and thus raise or depress the header-frame upon this outer bearing-wheel K, in addition to the adjustment provided by the guides M. As the character of the grain to be cut is well known beforehand, it is easy to make these adjustments before going into the field, as they do not need to be altered during a day's work, the slight variations needed in any particular field of grain being easily made by the usual method of tilting the header-frame.

This device is applicable to any style of pivoted header-frame. In the present case I have shown it in conjunction with a mechanism for which Letters Patent were issued to me August 14, 1888, No. 387,763. In this case the inner end of the brace-bar S is provided with a sliding adjusting-plate E similar to that shown in connection with the pin B.

Having thus described my invention, what I claim as new, and desire to secure by Letters Patent, is—

The thrasher and header frames, the block C, fixed to the side of the thrashing-machine, and a second plate or block pivoted thereto and having the vertical guides, in combination with the slide moving in said guides secured at different points by a bolt, and a pivot-pin by which the header-frame is connected and supported, said pin being hinged to the vertically-moving slide, substantially as herein described.

In witness whereof I have hereunto set my hand.

HENRY BRYAN.

Witnesses:
S. H. NOURSE,
H. C. LEE.